(12) United States Patent
Drory et al.

(10) Patent No.: US 7,991,779 B1
(45) Date of Patent: Aug. 2, 2011

(54) METHOD AND APPARATUS FOR POPULATING AN INDEX TABLE

(75) Inventors: Tal Drory, Halfa (IL); Amir Bar-Or, Newton, MA (US); Nitzan Peleg, Halfa (IL)

(73) Assignee: Hewlett Packard Development Company, L.P., Houston, TX (US)

( * ) Notice: Subject to any disclaimer, the term of this patent is extended or adjusted under 35 U.S.C. 154(b) by 1336 days.

(21) Appl. No.: 11/114,681

(22) Filed: Apr. 25, 2005

(51) Int. Cl.
  *G06F 7/00* (2006.01)
  *G06F 17/30* (2006.01)
(52) U.S. Cl. ........ 707/743; 707/705; 707/741; 707/745; 707/752; 707/756
(58) Field of Classification Search .................. None
  See application file for complete search history.

(56) References Cited

U.S. PATENT DOCUMENTS

| | | | | |
|---|---|---|---|---|
| 5,170,353 A * | 12/1992 | Verstraete | ...................... | 701/202 |
| 5,461,712 A * | 10/1995 | Chelstowski et al. | ......... | 345/543 |
| 5,511,190 A | 4/1996 | Sharma et al. | | |
| 5,600,763 A * | 2/1997 | Greene et al. | .................. | 345/420 |
| 5,717,911 A | 2/1998 | Madrid et al. | | |
| 5,724,570 A | 3/1998 | Zeller et al. | | |
| 5,819,255 A | 10/1998 | Celis et al. | | |
| 5,822,747 A | 10/1998 | Graefe et al. | | |
| 5,963,956 A * | 10/1999 | Smartt | ........................ | 707/104.1 |
| 5,968,109 A * | 10/1999 | Israni et al. | ..................... | 707/102 |
| 6,021,405 A | 2/2000 | Celis et al. | | |
| 6,029,173 A * | 2/2000 | Meek et al. | .................... | 707/102 |
| 6,339,772 B1 | 1/2002 | Klein et al. | | |
| 6,389,074 B1 * | 5/2002 | Andrew | .................... | 375/240.05 |
| 6,438,741 B1 | 8/2002 | Al-omari et al. | | |
| 6,684,219 B1 * | 1/2004 | Shaw et al. | ............... | 707/103 R |
| 6,711,560 B2 | 3/2004 | Levy et al. | | |
| 6,721,725 B2 | 4/2004 | Levy et al. | | |
| 6,745,174 B2 | 6/2004 | Levy et al. | | |
| 6,745,198 B1 * | 6/2004 | Luo et al. | ....................... | 707/102 |
| 6,920,446 B1 * | 7/2005 | Wang et al. | ....................... | 707/2 |
| 7,035,869 B2 * | 4/2006 | Smartt | ........................... | 707/102 |
| 2004/0103094 A1 | 5/2004 | Levy et al. | | |
| 2004/0193622 A1 | 9/2004 | Peleg et al. | | |
| 2004/0193654 A1 | 9/2004 | Peleg et al. | | |

OTHER PUBLICATIONS

"Spatial Data Structures" University of Maryland, 1995 by Hanan Samet.*
Webber et al., "Linear-Time Border-Tracing Algorithms for Quadtrees", Algorithmica, 1992.*
Aref, et al., "A Window Retrieval Algorithm for Spatial Databases Using Quadtrees."
Blakeley et al., Efficiently Updating Materialized Views, 1986 ACM 0-89791-191-1/86/0500/0061, Data Structuring Group, Department of Computer Science, University of Waterloo, Waterloo, Ontario, N2L 3G1.

(Continued)

*Primary Examiner* — Tim T. Vo
*Assistant Examiner* — Garrett Smith

(57) ABSTRACT

A disclosed embodiment relates to a system for populating an index table. The system comprises a component that decomposes a spatial object into a set of object pairs, a component that employs a value associated with the object pairs to sort the set of object pairs into a sequence of object pairs, a component that uses a sliding border analysis to create a subset of the sequence of object pairs depending upon a position of the object pair in the sequence of object pairs, and a component that populates the index table with the subset of object pairs.

26 Claims, 4 Drawing Sheets

OTHER PUBLICATIONS

Hjaltason, Gisili R., et al., Improved Bulk-Loading Algorithms for Quadtrees, Proc. of the 7th Intl. Symposium on GIS (ACM GIS '99), Kansas City, MO, Nov. 1999, pp. 110-115.

Hjaltason, Gisil R., et al., Speeding Up Bulk-Loading of Quadtrees, Proc. of the 5th Intl. ACM Workshop on Advances in GIS, Las Vegas, NV, Nov. 1997, pp. 50-53.

Mumick et al., "Maintenance of Data Cubes and Summary Tables in a Warehouse," pp. 100-111, 1997.

Samet, Hanan, Spatial Data Structures, Modern Database Systems: The Object Model, Interoperability, and Beyond, W. Kim, ed., Addison Wesley/ACM Press, Reading, MA, 1995, pp. 361-385.

U.S. Appl. No. 10/690,762, filed Oct. 22, 2003, Peleg et al.

U.S. Appl. No. 10/691,175, filed Oct. 22, 2003, Peleg et al.

U.S. Appl. No. 10/814,579, filed Mar. 31, 2004, Drory et al.

U.S. Appl. No. 10/813,843, filed Mar. 31, 2004, Peleg et al.

\* cited by examiner

METHOD AND APPARATUS FOR POPULATING AN INDEX TABLE

BACKGROUND OF THE RELATED ART

This section is intended to introduce the reader to various aspects of art, which relate to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Modern computer databases typically store immense amounts of data in one or more tables. For large databases, an index is used to speed up access. It takes a relatively long time to populate an index for later retrieval by a user. The time taken for a database to populate the index has an adverse impact on the performance of the database as a whole. If the database is populating an index table associated with a large number of objects, the time to create the index is seriously lengthened.

When the database includes spatial data in a base table, an index of the spatial data is created and referred to as a "spatial index table." Spatial data is any data with a location component, such as the location characteristics of objects in relation to space (for example, latitude and longitude). A spatial index table is actually stored as a separate table within the database.

In a complex database environment, the population of the spatial index table is inefficient because the insertion of each new node or spatial object employs multiple accesses to the information stored on disk. Swapping of portions of the index, to memory decreases the efficiency of the system. Accordingly, populating a spatial index tends to be inefficient and slow for base tables having spatial objects because of redundant input and output operations performed to build the spatial index table.

BRIEF DESCRIPTION OF THE DRAWINGS

Advantages of one or more disclosed embodiments become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which vary from one implementation to another. Moreover, it should be appreciated that such a development effort could be complex and time consuming, but would be a routine undertaking of design, fabrication, and manufacture for those of ordinary skill having the benefit of this disclosure.

Spatial index tables are used in databases to keep track of base table entries that include a location component. Different types of indexing, such as the Grid, R-tree, Quadtree, and/or a Polygon Map Region ("PMR") quadtree, are utilized to create the spatial index table. A quadtree is a spatial data structure based on a disjoint regular portioning of space. As known to those of ordinary skill in the art, the PMR quadtree is a quadtree variant intended for indexing objects of arbitrary spatial type. The spatial index table provides a logical reference to the spatial objects in the base table.

The process of populating spatial index tables contributes to system inefficiency when the PMR quadtree includes relatively large amounts of data. For many systems, an in-memory PMR quadtree is too large to be stored effectively. This inefficiency is exacerbated if the PMR quadtree is unbounded in the memory size during construction. To compensate, databases swap portions of the PMR quadtree in and out of memory to disk. That is, the portions of the PMR quadtree are temporarily stored on disk, or specific PMR quadtree nodes are removed to free memory space. The removed portions or nodes are then reinserted at a later time. Swapping PMR quadtree portions may also lead to system inefficiencies if a large number of swaps are performed over a given period of time.

Figure 1:
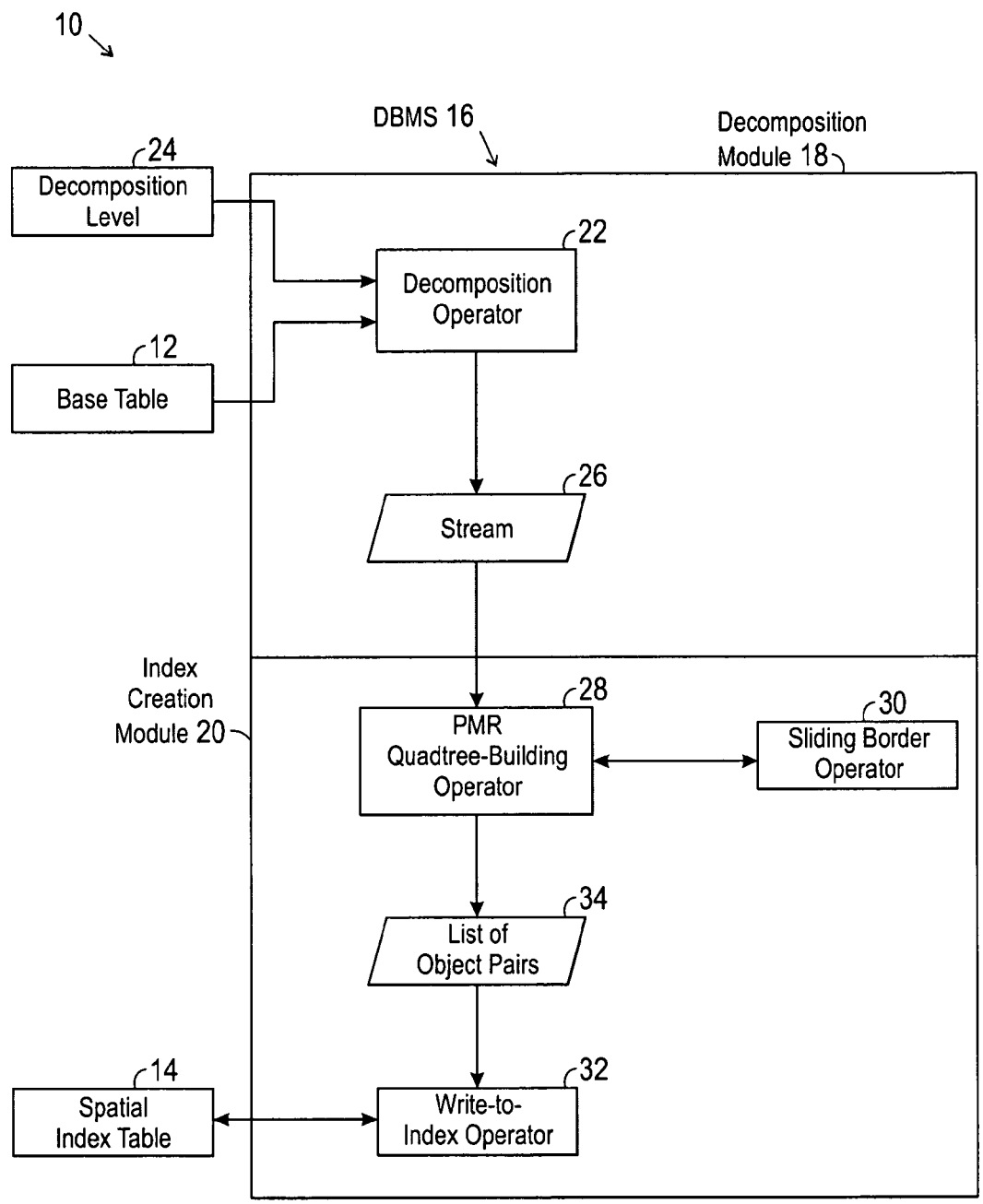
FIG. 1 is a block diagram of an exemplary database system illustrating one embodiment of the present invention.

FIG. 1 is a block diagram of an exemplary database system illustrating one embodiment of the present invention. The database system has software components including instructions on a computer-readable storage medium. The instructions when executed by a computer perform various tasks as described below. In FIG. 1, the database system is generally referred to by the reference numeral 10. A base table 12 contains a plurality of records. Data having a location component is indexed in a spatial index table 14 to facilitate improved access. The location component represents the location characteristics of objects in relation to the space in which the location component exists. Examples of spatial data include road maps, which contain points, lines, and polygons that represent the location of a city, roads, and the like. As another example, global positioning data includes a location component indicating an earth location (e.g., latitude and longitude) of an object.

In the database system 10, a bulk load operation is utilized to create and populate the spatial index table 14. As referenced above, a PMR quadtree uses an approximation spatial indexing approach to represent spatial objects or data in the base table 12 by the approximation of the spatial objects in the spatial index table 14. The spatial objects include an object identification ("OID") and a Zvalue, as discussed further below. The PMR quadtree is constructed to correspond to the spatial objects in the base table 12. Then, the spatial objects are inserted into the leaves (end nodes) of the spatial index table 14, which provides a logical reference to the objects.

Spatial index population operations are managed by a database management service (DBMS) 16, which includes one or more components, modules or processes, such as a decomposition module 18 and an index creation module 20. In the decomposition module 18, the objects of the base table 12 are decomposed into a predetermined estimated level, such as L, by a decomposition operator 22. The decomposition operator 22 generates a stream of pair values, such as the Zvalue and OID in the level L. Then, the stream of pair values is sorted by one of the pair values, such as the Zvalue, to form an input into the index creation module 20.

A decomposition operator 22 utilizes spatial objects in the base table 12 and an estimated decomposition level 24 to provide a stream 26 of object pairs having a Zvalue in the estimated decomposition level and an OID. In this stream 26, the object pairs, which are discussed below in FIG. 3, are sorted by the Zvalues in ascending order. That is, the decomposition operator 22 provides a stream 26 of sorted object pairs that represents the spatial objects in the base table 12. The operation of the decomposition operator 22 is further described in FIG. 2.

The index creation module 20 includes a PMR quadtree building operator 28 that creates a list of object pairs that are ready to be written to the spatial index table 14. By using the Zvalues in a specific decomposition level, the PMR quadtree building operator 28 maintains a small portion of the PMR quadtree in memory, with a goal of improving the efficiency of the process. The decomposed tiles of the spatial objects from the base table 12 are inserted into the PMR quadtree, instead of the spatial objects themselves. As a result, a portion of the PMR quadtree is maintained in memory for insertions of the various decomposed tiles.

The PMR quadtree-building operator 28 creates a list 34 of object pairs from the sorted stream 26. The PMR quadtree-building operator 28 utilizes a sliding border operator 30 to determine the object pairs that are updated and ready to be placed into the index table 14. The sliding border operator 30 provides the last Zvalue that was received from the sorted stream 26. Specifically, the sliding-border operator 30 logically divides the PMR quadtree into two parts: (1) PMR quadtree nodes that are to the left of the path from the root of the tree (the left-part or ancestor portion) and (2) PMR quadtree nodes that are to the right of the path from the root of the PMR quadtree (the right-part or a descendant portion). The sliding-border operator 30 is further described in FIG. 3. With the list 34 of object pairs, a write-to-index operator 32 writes the object pairs in the list 34 to the index table 14 because these object pairs are already updated.

By utilizing the Zvalues in a specific decomposition level of the decomposed objects, the PMR quadtree-building module 20 maintains a small portion of the PMR quadtree in memory. The memory size of the PMR quadtree can be blocked or bounded to reduce the removal and reinsertion of objects from the PMR quadtree. That is, by sorting the decomposed tiles, which is a relatively fast operation relative to disk swapping, the index population module enhances the system's performance by reducing the number of disk accesses needed to reinsert nodes into portions of the PMR quadtree.

Figure 2:
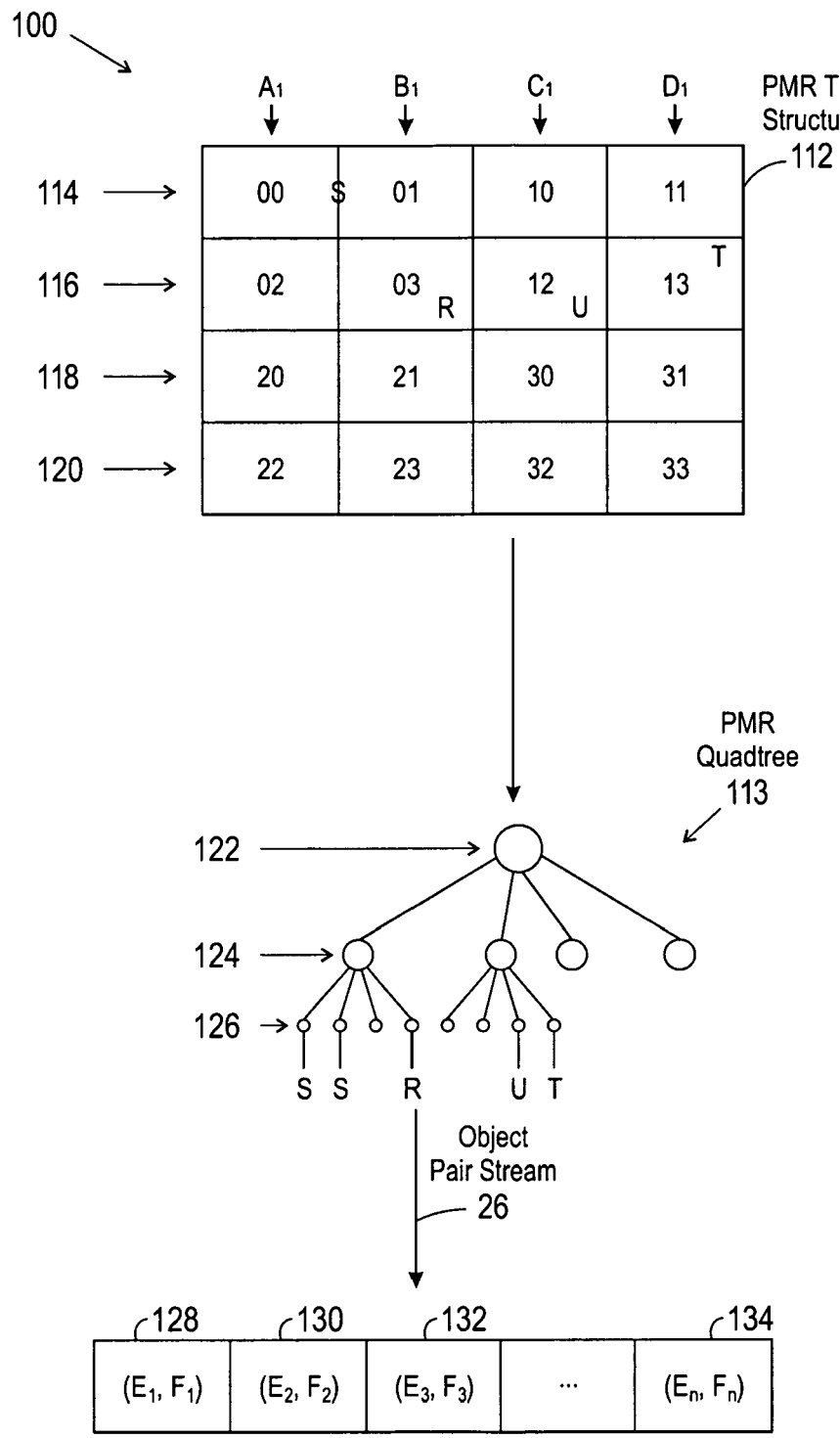
FIG. 2 is a block diagram that shows the operation of a decomposition module, illustrating one embodiment of the present invention.
Figure 3:
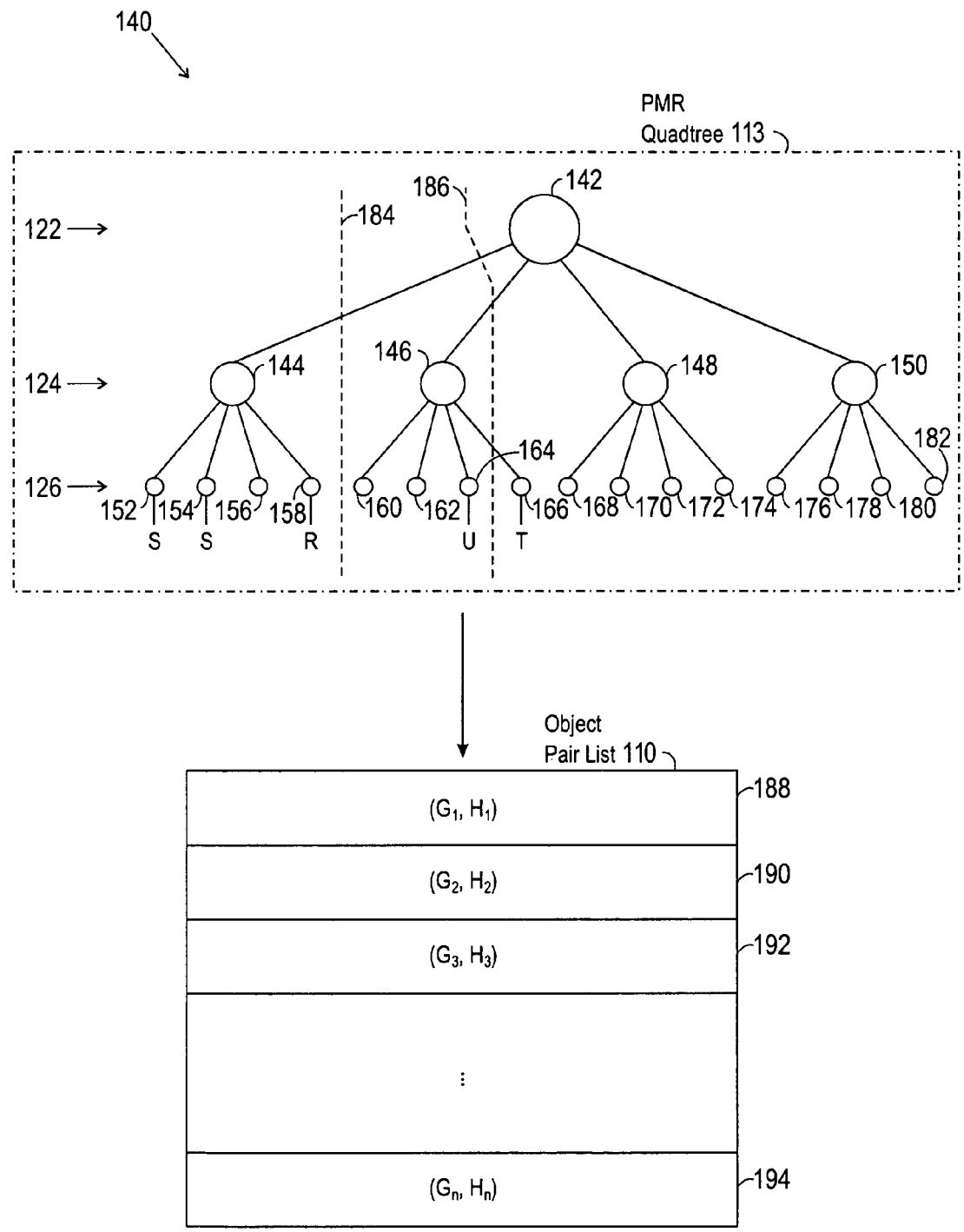
FIG. 3 is a block diagram of a sliding border illustrating one embodiment of the present invention.

FIG. 2 is a block diagram that shows the operation of a decomposition module, illustrating one embodiment of the present invention. The reference numeral 100 refers generally to the elements shown in FIG. 2. The representation of spatial objects R-U (from the base table 12) is shown through a PMR tile structure 112, an associated PMR quadtree 113 and a stream 26 of object pairs 128-134. The relationships between the PMR tile structure 112, the PMR quadtree 113, and the stream 26 of object pairs 128-134 are based on the Zvalues that represent the spatial objects R-U in the base table 12. The Zvalues are the value of the tiles $114A_1$-$120D_1$ associated with a specific region of the PMR tile structure 112.

In the PMR tile structure 112, spatial objects R-U are approximated by the intersection with tiles $114A_1$-$120D_1$. The PMR tile structure 112 is a spatial data structure based on a disjoint decomposition of the space into tiles $114A_1$-$120D_1$, which are labeled with the values "0-3." Each tile $114A_1$-$120D_1$ is a square with a side length of a power of 2, and is further decomposed into 4 equal sub-tiles. Accordingly, when the objects within the tile exceed a PMR threshold attribute, which is a density adaptive index, the tile $114A_1$-$120D_1$ is further divided into sub-tiles. Through this division of tiles, spatial objects R-U are represented by the stream 26 of object pairs 128-134. Those of ordinary skill in the art will appreciate that a block code, such as a Morton code or the like are included in the Zvalue to serve as the key to the spatial index table 14. Zvalues are obtained by bit interleaving the coordinate values of the tile $114A_1$-$120D_1$ to provide a mapping from the two-dimensional space of the tiles into a one-dimensional scalar, which is the Zvalue. This allows the spatial object R-U to be indexed and sorted into the stream 26 of object pairs 128-134.

In the PMR tile structure 112, each of the tiles $114A_1$-$120D_1$, which is represented by Zvalues that include two digits in the range of "0-3," is associated with other tiles to represent a larger tile. The larger tile is formed from grouping four tiles $114A_1$-$120D_1$ that have the same first digit in the Zvalues, which is referred to as a prefix. For example, the tiles $114A_1$, $114B_1$, $116A_1$ and $116B_1$ are sub-tiles of a larger tile with the Zvalue of "0," which is the prefix of the Zvalues for the tiles $114A_1$, $114B_1$, $116A_1$ and $116B_1$. Accordingly, the tiles $114A_1$, $114B_1$, $116A_1$ and $116B_1$ have respective Zvalues of "00," "01," "02" and "03." Similarly, the tiles $114C_1$, $114D_1$, $116C_1$ and $116D_1$ are sub-tiles of a larger tile with the Zvalue of "1." Accordingly, the tiles $114C_1$, $114D_1$, $116C_1$ and $116D_1$ have respective Zvalues of "10," "11," "12" and "13." The other tiles $118A_1$-$120D_1$ are grouped in a similar manner. Accordingly, through this division of tiles, spatial objects R-U are represented by as Zvalues that are shown in the PMR quadtree 113.

The PMR quadtree 113 is a data tree structure that is formed from the Zvalues associated with the tiles $114A_1$-$120D_1$. In particular, the PMR quadtree 113 is a layered data structure that includes four branches or leaves on each level to represent the Zvalue of the tile and the associated sub-tiles. The PMR quadtree 113 includes many different levels with each level of the exemplary embodiment shown in FIG. 2 having four leaves per node in the previous level. The PMR tile structure 112 is represented by the base level 122, while the first level 124 represents the large tiles that include the grouping of four tiles, such as tiles $114A_1$, $114B_1$, $116A_1$ and $116B_1$ or tiles $114C_1$, $114D_1$, $116C_1$ and $116D_1$, for example. The second level 126 represents the individual tiles $114A_1$-$120D_1$ with the associated Zvalues and spatial objects R-U. From the levels 122-126 of the PMR quadtree 113, the spatial objects R-U and the associated Zvalues of the tiles $114A_1$-$120D_1$ are represented. For instance, the spatial object R is represented by the Zvalue of "03," which is on the second level 126 and connected to the four node of the first level node, while the spatial object S is represented by the Zvalues of "00" and "01," which are also on the second level 126 and connected to the first and second nodes, respectively. From the PMR quadtree 113, the Zvalues associated with the spatial objects R-U being associated with different object pairs 128-134 in the stream 26.

The stream 26 includes various object pairs 128-134 that represent the spatial objects R-U in relation to the tiles $114A_1$-$120D_1$ for a specific level, as discussed above. The stream 26 includes Zvalue fields $E_1$-$E_n$ and object identification ("OID") fields $F_1$-$F_n$. The Zvalue fields $E_1$-$E_n$ include the Zvalue for the respective object pairs 128-134 in the stream 26, while the OID fields $F_1$-$F_n$ include the OID for the spatial objects R-U. For example, if the decomposition level is set to "1," the spatial object R is represented as object pair 130, which has a Zvalue of "0" and OID of "R." Similarly, the spatial object S is represented by the object pair 128, which has a Zvalue of "0" and OID of "S." Accordingly, the spatial objects R-U in the PMR tile structure 112 are represented in the stream 26 through various object pairs 128-134 with the Zvalue fields $E_1$-$E_n$ and OID fields $F_1$-$F_n$ in a specific decomposition level to provide an efficient spatial identifier that is utilized to efficiently perform index population operations.

To determine the specific decomposition level for the decomposition module 18, an estimated decomposition level 24 is determined based on statistics applied to on the base table 12. For instance, the estimated decomposition level 24 is based on the mean PMR quadtree height (levels in the PMR quadtree for different nodes and leaves). Because the decomposition level is an estimate, "under-decomposition" and "over-decomposition" conditions could result (i.e., differences between the estimate and the actual decomposition level). With "over-decomposition" conditions, a Zvalue is inserted into a leaf that is less detailed than the Zvalues of the level 124 or 126. For these situations, the leaves are associated with each of the object pairs 128-134 that were inserted into them. With an "under-decomposition" condition, the estimated decomposition level lacks the detail of an OID and Zvalue. In this situation, when a leaf is split, its OIDs are sent to re-decomposition (to a level determined by the leaf level plus an estimated delta), and the returned object pairs are used to push the objects to the matching leafs children.

As a specific example of the "under-decomposition" and "over-decomposition," a leaf with Zvalue of 10 has an object pair (101, A) inserted into it. In this example, the decomposition level is "3," and the input stream includes three object pairs (101, B), (102, B), (102, C) that are to be inserted into the PMR quadtree 113. After the insertion of the second object pair (101, B) into the leaf, the leaf splits into 4 new leaves and the two object pairs are pushed into them. With the insertion of the fourth object pair (102, C), another split occurs with the objects B and C being re-decomposed into Zvalues in the fifth level. In this example, the decomposition level is 3 and the delta level is 2. As a result, the decomposition module 18 has a PMR quadtree 113 that includes the leaves with values of (10201, B), (10203, B), (10223, B), (10202, C) and (10220, C). However, each of the objects is provided as a pair of values for each leaf. As such, the object pairs 128, 130 and 132 in the stream 26, which are provided to the index creation module 20, are the values of (101, A), (101, B), (1020, B) and (1020, C). This stream 26 lacks the over-decomposition Zvalue, if an over-decomposition Zvalue exists. With these sorted decomposed tiles of spatial objects R-U, the index creation module 20 utilizes the sliding border operator to further enhance the index population process, which is discussed below in FIG. 3.

FIG. 3 is a block diagram illustrating the operation of the sliding border utilized in the index creation module 20 of FIG. 1 in accordance with an embodiment of the present invention. The reference numeral 140 refers generally to the elements shown in FIG. 3. As an overview, the sliding border operator 30 (FIG. 1) divides the stream 26 into an updated portion and a non-updated portion. That is, the ascending order of the sorted stream 26 provided to the PMR quadtree-building operator 28 (FIG. 1) allows the sliding border operator 30 to determine the PMR quadtree nodes that are updated after each insertion of a new object pair having a Zvalue and OID.

While the sliding border operator 30 is utilized on the sorted stream 26, a complete PMR quadtree, such as PMR quadtree 113, is shown for exemplary purposes. The PMR quadtree 113 includes various nodes, such as nodes 142-182. These nodes 142-182 are separated into various levels, such as the base level 122, first level 124, and second level 126 that are associated with the decomposed tiles of the spatial objects, as discussed above. In this embodiment, the node 142 is the root node that is located in the base level 122. The nodes 144-150 are first level nodes that are in the first level 124, while the nodes 152-182 are the second level nodes located in the second level 126.

The sliding-border operator 30 (FIG. 1) determines the nodes of the PMR quadtree 113 that are provided to the list 34 (FIG. 1). The list 34 includes object pairs 188, 190, 192 and 194, which are based on the Zvalues representation of the spatial objects R-U and the spatial objects R-U. As noted above, the Zvalues are the value of the PMR quadtree 113 along with the associated spatial object that is associated with a specific node. The sliding-border operator 30 creates a sliding border, such as first sliding border 184 and second sliding border 186. These sliding borders 184 and 186 divide the PMR quadtree 113 into a left portion and a right portion. As such, the sliding borders 184 and 186 represent the last Zvalue was received from its input stream 26.

To the left of the sliding border 184, the Zvalues of the nodes 144, 152, 154, 156 and 158 of the PMR quadtree 113 are smaller than the sliding border, indicating that the nodes are ancestors). To the right of the sliding border 184, the Zvalues of the nodes 146, 148, 150, 160-182 of the PMR quadtree 113 are greater than the sliding border 184 or are a prefix to the sliding border 184. Please note that the node 142 is on the right of the sliding borders 184 and 186 because it is a prefix of each node. Accordingly, the sliding border 184 is adjusted when a new Zvalue is determined, which is based in the next object pair from the stream 26.

The division of the PMR quadtree 113 based upon the sliding border 184 enables the system to maintain a size-bounded portion of the PMR quadtree 113 in memory, which is referred to as a PMR sub-tree. The PMR sub-tree includes the nodes of the PMR quadtree 113 that are to the right of the sliding border 184. For instance, if the sliding-border corresponds to a leaf or node, such as second level nodes 152-182 in the PMR quadtree 113 that constitute a descendant of that node, then the in-memory PMR sub-tree is a thread of nodes from the root node 142 to that node. However in another embodiment, if the sliding border 184 corresponds to an internal node, such as nodes 144-150 in the PMR quadtree 113 that has no other descendents, then the PMR sub-tree is a thread of nodes from the root node 142 to the specific node in level 124, such as the decomposition level or the input stream's Zvalue level, and under that node a PMR sub-tree of an undefined shape. The PMR sub-tree under the specific node in decomposition level is a whole sub-tree with height up to the decomposition level with each leaf in the decomposition level. Thus, even if each of the leaves are populated with spatial objects R-U from the base table 12, the sliding border 184 bounds the size of the in-memory PMR sub-tree by setting the decomposition level for the input stream 26.

The information associated with the nodes to the left of the sliding border 184 is provided to the write-to-index operator 32 as the object list 34. The object list 34 includes Zvalue fields $G_1$-$G_n$ and OID fields $H_1$-$H_n$. The Zvalue fields $G_1$-$G_n$ include the Zvalue for the respective leaves of the PMR quadtree 113 that are to the left of the sliding border 184, while the OID fields $H_1$-$H_n$ include the OID for the spatial objects R-U. As an example, the node 152 has a Zvalue of "00" and an OID of "S," the node 154 has a Zvalue of "01" and OID of "S," the node 158 has a Zvalue of "03" and OID of "R," the node 164 has a Zvalue of "12" and OID of "U," and the node 166 has a Zvalue of "13" and OID of "T." With the sliding border 184, the list 34 includes a first object pair 188 having a Zvalue of "00" and an OID of "S," a second object pair 190 having a Zvalue of "01" and OID of "S" and a third object pair having a Zvalue of "03" and OID of "R." These object pairs 188, 190 and 192 have been previously updated and are stored to disk. With the sliding border 186, the list 34 includes a first object pair 188 having a Zvalue of "00" and an OID of "S," a second object pair 190 having a Zvalue of "01" and OID of "S," a third object pair 192 having a Zvalue of "03" and OID of "R" and a fourth object pair 194 having a Zvalue of "12" and OID of "U." Accordingly, the spatial objects R-U in the PMR quadtree 113, which are updated, are represented in the list 34 of object pairs 188, 190, 192 and 194 that are provided to the write-to-index operator 32.

The sliding border operator 30 allows the PMR quadtree-building operator 28 to determine the leaves and the nodes in the left-part of the PMR quadtree 113. As such, after each insertion of a different Zvalue, new leaves and nodes are placed in the left-part of the PMR quadtree 113 because these leaves and nodes can be written to the spatial index table 14. Then, the nodes and leaves are de-allocated from memory by storing them to disk and their memory is returned to the memory pool.

Figure 4:
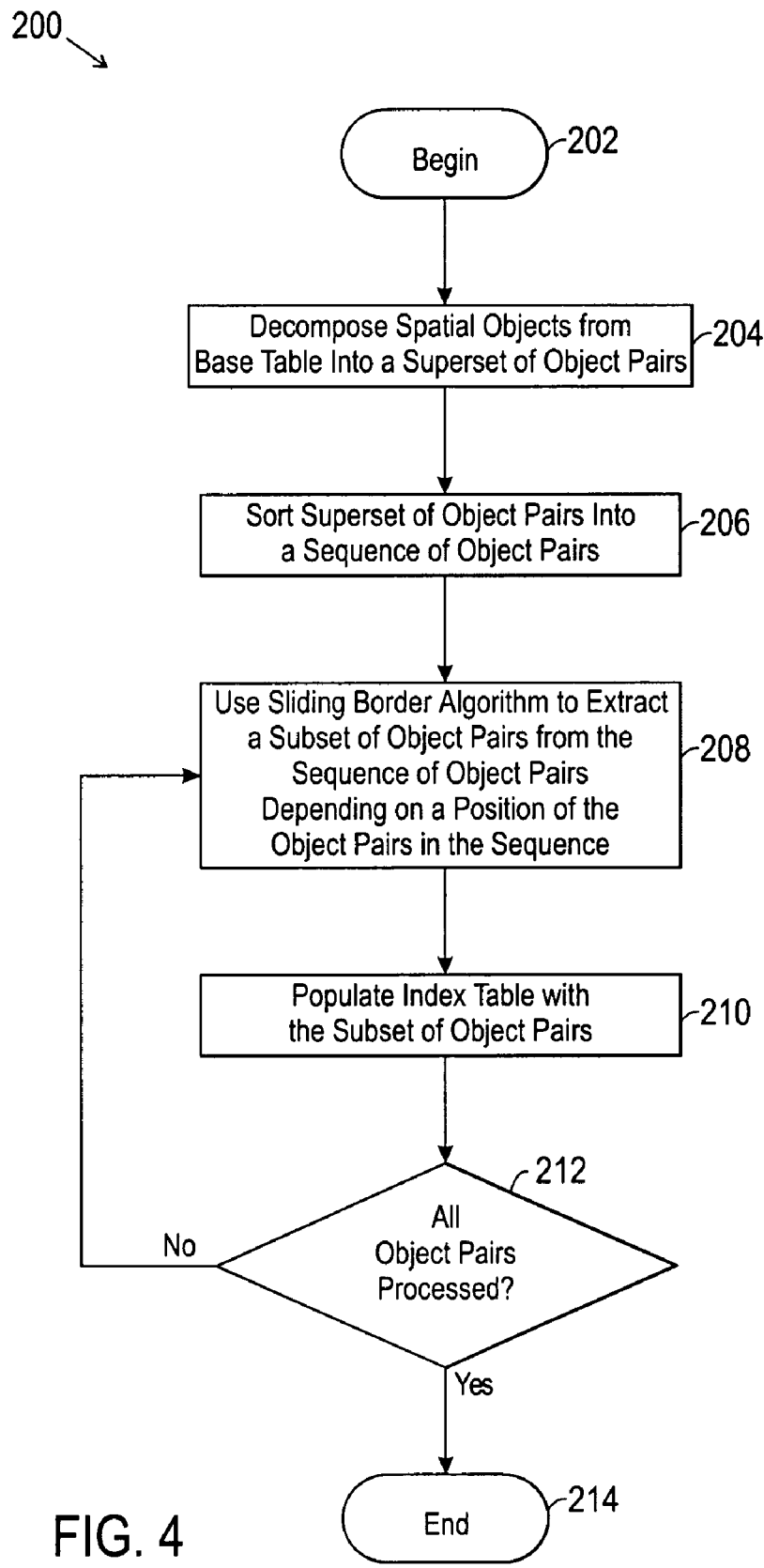
FIG. 4 is a flow diagram that shows a process illustrating one embodiment of the present invention.

FIG. 4 is a flow diagram that shows a process illustrating one embodiment of the present invention. The process is generally referred to by the reference number 200. At block 202, the process begins. At block 204, a spatial object from a base table is decomposed into a set of object pairs. If the base table has multiple spatial objects, the spatial objects can be decomposed into a unitary superset of object pairs. The set or superset of object pairs is sorted into a sequence of object pairs at block 206. At block 208, the sliding border algorithm discussed above with reference to FIG. 3 is employed to extract a subset of object pairs from the sequence of object pairs depending on a position in the sequence of the object pairs. At block 210, an index table is populated with the subset of object pairs. As shown at decision block 212, the sliding border algorithm is applied until all object pairs have been processed. When all object pairs have been processed, the process ends at block 214.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A system for populating an index table, comprising:
a memory;
a computer;
a component executable on the computer that decomposes a spatial object into a set of object pairs;
a component executable on the computer that employs values associated with the object pairs to sort the set of object pairs into a sequence of object pairs;
a component executable on the computer that uses a sliding border analysis to create a subset of the sequence of object pairs depending upon positions of the object pairs in the sequence relative to a sliding border defined by the sliding border analysis, wherein the object pairs in the subset are associated with positions on a first side of the sliding border, and wherein the sliding border analysis is to process the sequence of object pairs and to adjust a position of the sliding border according to the processing of the sequence of object pairs;
a component executable on the computer that stores, in the memory, object pairs associated with positions on a second, different side of the sliding border, and that removes, from the memory, object pairs associated with positions on the first side of the sliding border, wherein as the sliding border is adjusted additional object pairs are removed from the memory; and
a component executable on the computer that populates the index table with the subset of object pairs, wherein as the sliding border is adjusted according to the processing of the sequence of object pairs, additional object pairs are to be added to the subset that populates the index table.

2. The system set forth in claim 1, wherein the index table comprises a spatial index table.

3. The system set forth in claim 1, wherein the spatial object is decomposed using a given decomposition level.

4. The system set forth in claim 3, wherein the decomposition level comprises a mean level of a polygon map region (PMR) quadtree.

5. The system set forth in claim 1, wherein the set of object pairs is represented as a quadtree, wherein the sliding border divides the quadtree into a first part and a second part, wherein the subset of object pairs is in the first part of the quadtree, and wherein as the sliding border is adjusted according to processing of the sequence of object pairs, the first part of the quadtree is to grow in size.

6. The system set forth in claim 5, wherein the quadtree comprises a polygon map region (PMR) quadtree.

7. The system set forth in claim 1, wherein the set of object pairs is represented as a tile structure.

8. The system set forth in claim 7, wherein the tile structure comprises a sub-tile.

9. The system set forth in claim 5, wherein the system is configured to use a bounded portion of the memory to store the index table, wherein the bounded portion of the memory is for use to store the object pairs in the second part, and wherein the object pairs in the first part are to be removed from the memory for storing into the index table.

10. The system set forth in claim 1, wherein each object pair comprises a Zvalue and an object identification field.

11. The system set forth in claim 1, wherein the spatial object is derived from a base table.

12. A method of populating an index table, comprising:
decomposing, by a computer, at least one spatial object into a set of object pairs;
sorting, by the computer, the set of object pairs into a sequence of object pairs using values associated with the object pairs;
employing, by the computer, a sliding border algorithm to extract a subset of object pairs from the sequence of object pairs depending upon positions of the object pairs in the sequence relative to a sliding border defined by the sliding border algorithm;
receiving, by the computer, new object pairs of the sequence of object pairs;
moving, by the computer, the sliding border as the new object pairs of the sequence of object pairs are received, wherein as the sliding border is moved, additional object pairs associated with positions on a first side of the sliding border are added to the subset;
storing, in a memory, object pairs associated with positions on a second, different side of the sliding border, and removing, from the memory, object pairs associated with positions on the first side of the sliding border; and
populating, by the computer, the index table with the subset of object pairs, wherein the subset is defined by a current position of the sliding border.

13. The method set forth in claim 12, wherein the index table comprises a spatial index table.

14. The method set forth in claim 12, wherein the spatial object is decomposed relative to a decomposition level.

15. The method set forth in claim 14, wherein the decomposition level comprises a mean level of a polygon map region (PMR) quadtree.

16. The method of claim 12, wherein as the sliding border is moved, additional object pairs are removed from the memory.

17. The method set forth in claim 16, wherein the set of object pairs is represented as a quadtree, wherein the sliding border divides the quadtree into a first part and a second part, wherein the first part includes the object pairs on the first side of the sliding border, and the second part includes the object pairs on the second side of the sliding border, and wherein as the sliding border moves, the first part of the quadtree grows in size.

18. The method set forth in claim 17, wherein the quadtree comprises a polygon map region (PMR) quadtree.

19. The method of claim 16, further comprising:
storing the object pairs removed from the memory into a persistent storage.

20. The method set forth in claim 12, wherein each of the object pairs comprises a Zvalue and an object identification field.

21. The method set forth in claim 12, wherein the recited acts are performed in the recited order.

22. A database system comprising a non-transitory computer-readable storage medium containing instructions that are executable by a computer, the instructions upon execution causing the computer to:
decompose a spatial object into a set of object pairs;
sort the set of object pairs into a sequence of object pairs using values associated with the object pairs;
create a subset of the sequence of object pairs via a sliding border algorithm depending upon positions of the object pairs in the sequence relative to a sliding border defined by the sliding border algorithm, wherein the sliding border algorithm processes the sequence of object pairs and adjusts a position of the sliding border according to the processing of the sequence of object pairs;
populate the index table with the subset of the sequence of object pairs, wherein as the sliding border is adjusted according to the processing of the sequence of object pairs, additional object pairs are added to the subset that populates the index table, wherein the index table is populated with the subset of object pairs associated with positions on a first side of the sliding border; and
store, in a memory, object pairs associated with positions on a second, different side of the sliding border, wherein the object pairs associated with positions on the first side of the sliding border are removed from the memory.

23. A system for populating a spatial index table, comprising:
a memory;
a computer;
a base table that contains a plurality of spatial objects;
a component executable by the computer that compares the plurality of spatial objects to a decomposition level to produce a comparison result for each of the plurality of spatial objects;
a component executable by the computer that employs the comparison result to decompose each of the plurality of spatial objects into an object pair that comprises a Zvalue and an object identification value;
a component executable by the computer that sorts the plurality of object pairs into a sequence using the Zvalue associated with the object pair and places each of the plurality of object pairs in a polygon map region (PMR) quadtree;
a component executable by the computer that uses a sliding border algorithm to analyze the PMR quadtree and create a subset of the plurality of object pairs depending upon a position in the PMR quadtree of each of the plurality of object pairs in relation to a sliding border of the sliding border algorithm, wherein the object pairs in the subset are associated with positions on a first side of the sliding border, and wherein the sliding border is to be moved by the sliding border algorithm according to processing of the sequence of object pairs;
a component executable by the computer that stores, in the memory, object pairs associated with positions on a second, different side of the sliding border, and that removes, from the memory, object pairs associated with positions on the first side of the sliding border, wherein as the sliding border is adjusted additional object pairs are removed from the memory; and
a component executable by the computer that populates the spatial index table with the subset of the plurality of object pairs, wherein as the sliding border is moved according to the processing of the sequence of object pairs, additional object pairs are to be added to the subset that populates the spatial index table.

24. The system set forth in claim 23, wherein the decomposition level comprises a mean level of the PMR quadtree.

25. The system set forth in claim 23, comprising a component that is executable to create a list of the subset of the plurality of object pairs prior to populating the spatial index table.

26. A non-transitory computer-usable medium storing instructions, which when executed by a computer, effect populating an index table, comprising:
decomposing at least one spatial object into a set of object pairs;
sorting the set of object pairs into a sequence of object pairs using values associated with the object pairs;
using a sliding border analysis to create a subset of the sequence of object pairs depending upon positions of the object pairs in the sequence relative to a sliding border defined by the sliding border analysis;
receiving new object pairs of the sequence;
moving the sliding border as the new object pairs of the sequence of object pairs are received, wherein as the sliding border is moved, additional object pairs are added to the subset;
populating the index table with the subset of the sequence of object pairs, wherein the subset is defined by a current position of the sliding border, wherein populating the index table with the subset of the sequence of object pairs comprises populating the index table with the subset of the sequence of object pairs associated with positions on a first side of the sliding border;
storing, in a memory, object pairs associated with positions on a second, different side of the sliding border; and
removing, from the memory, object pairs associated with positions on the first side of the sliding border, wherein as the sliding border is moved, additional object pairs are removed from the memory.

* * * * *